(12) United States Patent
Kamineni et al.

(10) Patent No.: US 11,571,975 B2
(45) Date of Patent: Feb. 7, 2023

(54) DYNAMIC WIRELESS POWER TRANSFER BASE PAD

(71) Applicant: Utah State University, Logan, UT (US)

(72) Inventors: Abhilash Kamineni, North Logan, UT (US); Reebal Nimri, Logan, UT (US)

(73) Assignees: Toyota Motor Engineering & Manufacturing North America, Inc., Plano, TX (US); Utah State University, Logan, UT (US)

( * ) Notice: Subject to any disclaimer, the term of this patent is extended or adjusted under 35 U.S.C. 154(b) by 182 days.

(21) Appl. No.: 17/022,905

(22) Filed: Sep. 16, 2020

(65) Prior Publication Data
US 2021/0078417 A1 Mar. 18, 2021

Related U.S. Application Data (60) Provisional application No. 62/901,187, filed on Sep. 16, 2019.

(51) Int. Cl.
*H02J 7/00* (2006.01)
*B60L 53/122* (2019.01)
*H02J 50/12* (2016.01)

(52) U.S. Cl.
CPC ............ *B60L 53/122* (2019.02); *H02J 50/12* (2016.02)

(58) Field of Classification Search
USPC .......................... 320/106, 107, 108, 109, 110
See application file for complete search history.

(56) References Cited

U.S. PATENT DOCUMENTS

| 4,876,521 A | 10/1989 | Boyd |
| 8,185,212 B2 | 5/2012 | Carbunaru et al. |

(Continued)

FOREIGN PATENT DOCUMENTS

| KR | 20110041307 A | 4/2011 |
| WO | 2017165549 A1 | 9/2017 |

(Continued)

OTHER PUBLICATIONS

Tan et al., "Research on an EV Dynamic Wireless Charging Control Method Adapting to Speed Change," Energies, vol. 12, issue 11, Jun. 11, 2019, pp. 1-13.

(Continued)

*Primary Examiner* — Brian Ngo
(74) *Attorney, Agent, or Firm* — Christopher G. Darrow; Darrow Mustafa PC (57) ABSTRACT

A dynamic wireless power transfer base pad can include a housing, a first conductor, a second conductor, and a third conductor. The first conductor can be disposed within the housing substantially along a circumference and can be configured to conduct a first current to produce a first magnetic field. The second conductor can be disposed at a first end within the housing and can be configured to conduct a second current to produce a second magnetic field. A magnetic field at the first end can include a constructive superimposition of the first magnetic field with the second magnetic field. The third conductor can be disposed at a second end within the housing and can be configured to conduct a third current to produce a third magnetic field. A magnetic field at the second end can include a constructive superimposition of the first magnetic field with the third magnetic field.

20 Claims, 9 Drawing Sheets

(56) References Cited

U.S. PATENT DOCUMENTS

| | | | |
|---|---|---|---|
| 9,533,590 B2 | 1/2017 | Keeling et al. | |
| 11,398,747 B2* | 7/2022 | Partovi | H02J 7/0013 |
| 2010/0231219 A1 | 9/2010 | Manz et al. | |
| 2013/0119926 A1 | 5/2013 | Lin | |
| 2013/0154553 A1 | 6/2013 | Steele | |
| 2015/0298559 A1* | 10/2015 | Keeling | B60M 7/003 |
| | | | 320/108 |
| 2019/0006094 A1* | 1/2019 | Furiya | B60L 53/126 |
| 2019/0027966 A1* | 1/2019 | Cho | H01F 38/14 |
| 2020/0070673 A1* | 3/2020 | Nishimura | H01F 27/02 |
| 2021/0104913 A1* | 4/2021 | Khalilinia | H01F 38/14 |

FOREIGN PATENT DOCUMENTS

| | | | |
|---|---|---|---|
| WO | 2018196385 A1 | 11/2018 | |
| WO | WO-2019074378 A1 * | 4/2019 | |
| WO | 2020010861 A1 | 1/2020 | |

OTHER PUBLICATIONS

Waters et al., "Power Delivery and Leakage Field Control Using an Adaptive Phased Array Wireless Power System," IEEE Transactions on Power Electronics, vol. 30, No. 11, Nov. 2015, pp. 6298-6309.

Ranganathan, et al., "Localization of Receivers using Phased-Array Wireless Power Transfer Systems," 2015 IEEE Wireless Power Transfer Conference, May 2015, pp. 1-4.

Alexander Hellemans, "Boosting the Transfer Efficiency of Wireless Power Transfer Systems," IEEE Spectrum.

Elwalaty et al., "Modeling, Analysis, and Implementation of Series-Series Compensated Inductive Coupled Power Transfer (ICPT) System for an Electric Vehicle," Journal of Electrical and Computer Engineering, vol. 2020, Article ID 9561523, pp. 1-10.

Unknown, "Dynamic Wireless Charging," Magment, pp. 1-8, found at https://www.magment.de/en-dynamic-wireless-charging.

Joachim Taiber "Wirelessly Charge Electric Vehicles by Induction While Driving," IEEE Transportation Electrification Community, Feb. 2014, 2 pages.

Unknown, "Litz Wire," (last accessed May 5, 2020, 5 pages) found at https://en.wikipedia.org/wiki/Litz_wire.

Rahbari et al., "Battery Aging Prediction Using Input-Time-Delayed Based on an Adaptive Neuro-Fuzzy Inference System and a Group Method of Data Handling Techniques," Applied Sciences, vol. 8, Aug. 4, 2018, pp. 1-16.

Miller et al., "High-Power Wireless Charging of Heavy Duty EVs: Techniques, Challenges and Limitations," Dec. 2017, pp. 1-21.

Yugang et al., "Design and Switching Control of Power Supply Coils Applied to ICPT-Based Electric Vehicles," Journal of Southwest Jiaotong University, vol. 51, No. 1, Feb. 2016, pp. 168-176.

Song et al., "A Review of Dynamic Wireless Power Transfer for In-Motion Electric Vehicles," Wireless Power Transfer—Fundamentals and Technologies, 2016, pp. 109-128.

Foote et al., "Optimal Sizing of a Dynamic Wireless Power Transfer System for Highway Applications," 2018 IEEE Transportation Electrification Conference and Expo, Jun. 2018, pp. 1-6.

Yang et al., "Segmental Track Analysis in Dynamic Wireless Power Transfer," Energies 2019, vol. 12, Oct. 14, 2019, pp. 1-15.

International Search Report and Written Opinion, PCT Application No. PCT/US2020/051067, "Dynamic Wireless Power Transfer Base Pad," 10 pages.

* cited by examiner

DYNAMIC WIRELESS POWER TRANSFER BASE PAD

CROSS-RELATED TO RELATED APPLICATIONS

This application claims the benefit of U.S. Provisional Application No. 62/901,187, filed Sep. 16, 2019, the contents of which are incorporated herein in their entirety by reference.

TECHNICAL FIELD

The disclosed technologies are directed to mechanisms for recharging a battery of an electric vehicle. Specifically, the disclosed technologies are directed to using a dynamic wireless power transfer (DWPT) system for recharging a battery of an electric vehicle.

BACKGROUND

An engine of a conventional motor vehicle can, through a combustion process, consume a fossil fuel to produce a propulsion force. Because waste products of the combustion process can include pollutants, efforts have been made to produce the propulsion force through different mechanisms. Among such efforts have been those that can use an electric motor to produce the propulsion force. Power to the electric motor can be provided, for example, by a battery. Typically, the battery can be configured to be connected, as necessary, by wires to an alternating current power source in order to be recharged. Unfortunately, recharging the battery in this manner can require a duration of time that can range from twenty minutes to six hours.

SUMMARY

In an embodiment, a dynamic wireless power transfer base pad can include a housing, a first conductor, a second conductor, and a third conductor. The housing can have a simple closed curve shape defined by a first axis and a second axis. The housing can have a first end along the first axis. The housing can have a second end along the first axis. The first conductor can be disposed within the housing substantially along a circumference of the housing. The first conductor can be configured to conduct a first current to produce a first magnetic field. The second conductor can be disposed within the housing at the first end. The second conductor can be configured to conduct a second current to produce a second magnetic field. A magnetic field at the first end can include a constructive superimposition of the first magnetic field with the second magnetic field. The third conductor can be disposed within the housing at the second end. The third conductor can be configured to conduct a third current to produce a third magnetic field. A magnetic field at the second end can include a constructive superimposition of the first magnetic field with the third magnetic field. The dynamic wireless power transfer base pad can be configured to be installed one or more of under a road, next to the road, or on the road.

In another embodiment, a dynamic wireless power transfer base system can include a first dynamic wireless power transfer base pad and a second dynamic wireless power transfer base pad. The first dynamic wireless power transfer base pad can have a simple closed curve shape defined by a first axis. The first dynamic wireless power transfer base pad can have one or more first conductors configured to conduct one or more first currents to produce a first magnetic field. The second dynamic wireless power transfer base pad can have the simple closed curve shape defined by a second axis. The second dynamic wireless power transfer base pad can have one or more second conductors configured to conduct one or more second currents to produce a second magnetic field. The dynamic wireless power transfer base system can be configured to be installed one or more of under a road, next to the road, or on the road. A strength of the first magnetic field can be substantially equal along a first line a specific distance above the road and parallel to the first axis. A strength of the second magnetic field can be substantially equal along a second line the specific distance above the road and parallel to the second axis. The first dynamic wireless power transfer base pad can be disposed, after the dynamic wireless power transfer base system has been installed, adjacent to the second dynamic wireless power transfer base pad. The dynamic wireless power transfer base system can be configured so that, after the dynamic wireless power transfer base system has been installed, no line perpendicular to a plane defined by the road intersects both the one or more first conductors and the one or more second conductors.

In another embodiment, a method for producing a combined magnetic field can include causing a first current to be conducted by a first conductor, having a length, to produce a first magnetic field. The method can include causing a second current to be conducted by a second conductor, disposed at a first end of the first conductor, to produce a second magnetic field. A magnetic field at the first end can include a constructive superimposition of the first magnetic field with the second magnetic field. The method can include causing a third current to be conducted by a third conductor, disposed at a second end of the first conductor, to produce a third magnetic field. A magnetic field at the second end can include a constructive superimposition of the first magnetic field with the third magnetic field, the second end being opposite the first end. The combined magnetic field can be produced along a line parallel to the length so that a strength of the combined magnetic field at a point on the line opposite a center of the length can be substantially equal to a strength of the combined magnetic field at a point on the line opposite the first end and can be substantially equal to a strength of the combined magnetic field at a point on the line opposite the second end.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Dynamic wireless power transfer (DWPT) technology can be used to recharge a battery that provides power to an electric motor that produces a propulsion force for an electric vehicle. Advantageously, DWPT technology can recharge the battery in a manner that does not require the battery to be connected by wires to an alternating current power source.

Figure 1:
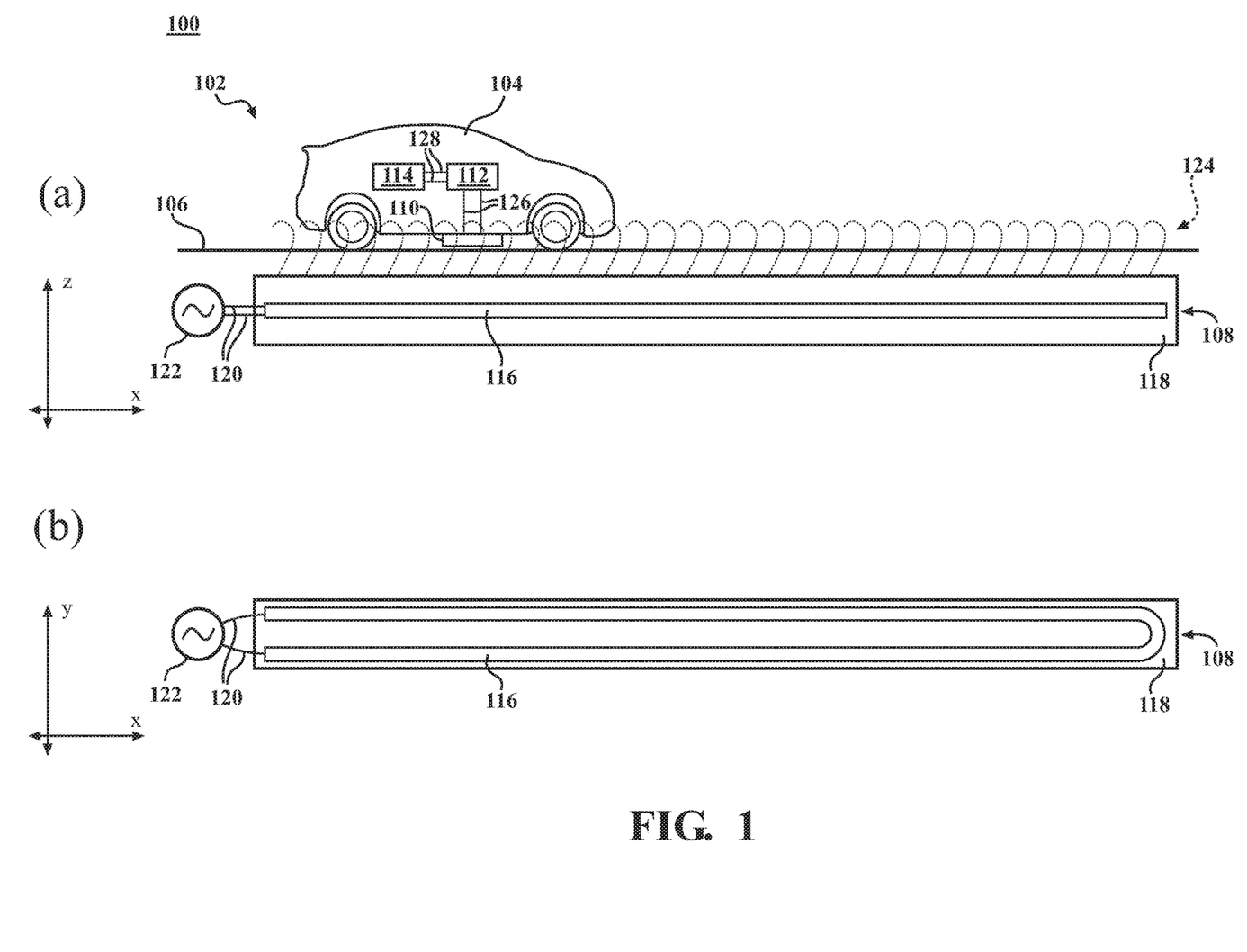
FIG. 1 is a diagram that includes an example of an environment that includes a first type of conventional dynamic wireless power transfer (DWPT) system.

FIG. 1 is a diagram that includes an example of an environment 100 that includes a first type of conventional DWPT system 102. A view (a) of FIG. 1 is a diagram that includes the example of the environment 100 from a perspective of an x-z coordinate system. The environment 100 can include an electric vehicle 104 on a road 106. This first type of conventional DWPT system 102 can include a DWPT base system 108 and a DWPT receiving system 110. The DWPT receiving system 110, a power converter 112, and a battery 114 can be installed on the electric vehicle 104. The DWPT base system 108 can be installed under the road 106 as illustrated in the view (a) of FIG. 1. Additionally or alternatively, the DWPT base system 108 can be installed next to the road 106 or on the road 106. For example, the DWPT base system 108 can be 150 feet long. The DWPT base system 108 can include a rail 116 disposed within a housing 118. The rail 116 can be connected by first wires 120 to an alternating current power source 122. The rail 116 can be configured to conduct a current to produce a magnetic field 124. With the electric vehicle 104 in motion on the road 106, the magnetic field 124 can cause an alternating current to be produced in the DWPT receiving system 110. The DWPT receiving system 110 can be connected by second wires 126 to the power converter 112. The power convertor 112 can be configured to convert the alternating current to a direct current. The power converter 112 can be connected by third wires 128 to the battery 114. The direct current can charge the battery 114. A view (b) of FIG. 1 is a diagram that includes an example of the DWPT base system 108 from a perspective of an x-y coordinate system.

Unfortunately, because the rail 116 of the DWPT base system 108 is connected to the alternating current power source 122, which is centralized, this first type of conventional DWPT system 102 can be vulnerable to problems that may be associated with the alternating current power source 122. Additionally, because the rail 116 can be continually connected to the alternating current power source 122 to produce the magnetic field 124 along a whole of a length of the DWPT base system 108, the efficiency of the transfer of power from the alternating current power source 122 to the magnetic field 124 for this first type of conventional DWPT system 102 can be low.

Figure 2:
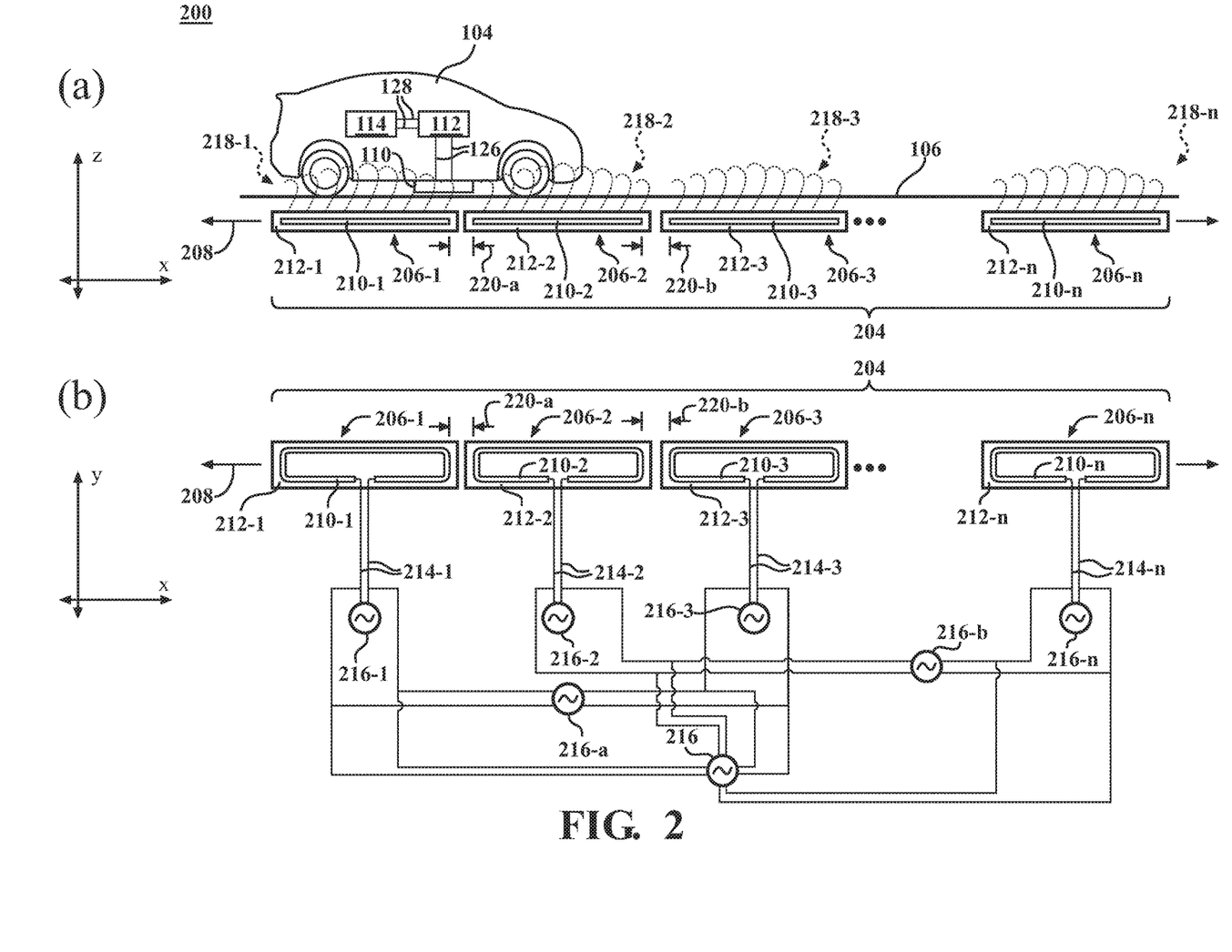
FIG. 2 is a diagram that includes an example of an environment that includes a second type of conventional DWPT system.

FIG. 2 is a diagram that includes an example of an environment 200 that includes a second type of conventional DWPT system 202. A view (a) of FIG. 2 is a diagram that includes an example of a portion of the environment 200 from a perspective of an x-z coordinate system. The environment 200 can include the electric vehicle 104 on the road 106. This second type of conventional DWPT system 202 can include a DWPT base system 204 and the DWPT receiving system 110. The DWPT receiving system 110, the power converter 112, and the battery 114 can be installed on the electric vehicle 104. The DWPT base system 204 can be installed under the road 106 as illustrated in the view (a) of FIG. 2. Additionally or alternatively, the DWPT base system 204 can be installed next to the road 106 or on the road 106. The DWPT base system 204 can include DWPT base pads 206-1, 206-2, 206-3, . . . , 206-$n$. For example, one of the DWPT base pads 206-1, 206-2, 206-3, . . . , 206-$n$ can be 10 feet long. Each of the DWPT base pads 206-1, 206-2, 206-3, . . . , 206-$n$ can be disposed, after the DWPT base system 204 has been installed, adjacent to another of the DWPT base pads 206-1, 206-2, 206-3, . . . , 206-$n$. For example, the DWPT base pads 206-1, 206-2, 206-3, . . . , 206-$n$ can be disposed along an axis 208. Each of the DWPT base pads 206-1, 206-2, 206-3, . . . , 206-$n$ can include a corresponding conductor 210-1, 210-2, 210-3, . . . , 210-$n$ disposed within a corresponding housing 212-1, 212-2, 212-3, . . . , 212-$n$.

A view (b) of FIG. 2 is a diagram that includes an example of a portion of the environment 200 from a perspective of an x-y coordinate system. Each of the DWPT base pads 206-1, 206-2, 206-3, . . . , 206-$n$ can be connected by corresponding first wires 214-1, 214-2, 214-3, . . . , 214-$n$ to corresponding alternating current power sources 216-1, 216-2, 216-3, . . . , 216-$n$. Alternatively, more than one of the DWPT base pads 206-1, 206-2, 206-3, . . . , 206-$n$ can be connected to a single alternating current power source. For example, the DWPT base pads 206-1 and 206-3 can be connected to alternating current power source 216-$a$; and the DWPT base pads 206-2 and 206-$n$ can be connected to alternating current power source 216-$b$. Alternatively, for example, the DWPT base pads 206-1, 206-2, 206-3, . . . , 206-$n$ can be connected to alternating current power source 216. With reference to the view (a) of FIG. 2, each of the conductors 210-1, 210-2, 210-3, . . . , 210-$n$ can be configured to conduct a corresponding current to produce a corresponding magnetic field 218-1, 218-2, 218-3, . . . , 218-$n$. With the electric vehicle 104 in motion on the road 106, the magnetic fields 218-1, 218-2, 218-3, . . . , 218-$n$ can cause an alternating current to be produced in the DWPT receiving system 110. The DWPT receiving system 110 can be connected by the second wires 126 to the power converter 112. The power convertor 112 can be configured to convert the alternating current to a direct current. The power converter 112 can be connected by the third wires 128 to the battery 114. The direct current can charge the battery 114.

Because this second type of conventional DWPT system 202 uses multiple DWPT base pads 206-1, 206-2, 206-3, . . . , 206-$n$, each of which can be connected to a corresponding alternating current power sources 216-1, 216-2, 216-3, . . . , 216-$n$, the second type of conventional DWPT system 202 can be less vulnerable than the first type of conventional DWPT system 102 to problems that may be associated with any of the alternating current power sources 216-1, 216-2, 216-3, . . . , 216-$n$. Additionally, because this second type of conventional DWPT system 202 can be configured so that only the one (or more) of the multiple DWPT base pads 206-1, 206-2, 206-3, . . . , 206-$n$ that is (or are) nearest to the electric vehicle 104 as it is in motion on the road 106 is (or are) connected to its (or their) corresponding alternating current power sources 216-1, 216-2, 216-3, . . . , 216-$n$ to produce its (or their) corresponding magnetic field 218-1, 218-2, 218-3, . . . , 218-$n$, the second type of conventional DWPT system 202 can improve, in comparison with the first type of conventional DWPT system 102, the efficiency of the transfer of power from the alternating current power sources 216-1, 216-2, 216-3, . . . , 216-$n$ to the corresponding magnetic fields 218-1, 218-2, 218-3, . . . , 218-$n$. Moreover, because this second type of conventional DWPT system 202 uses multiple DWPT base pads 206-1, 206-2, 206-3, . . . , 206-$n$, maintenance and repair procedures can be easier to perform on the DWPT base system 204 of the second type of conventional DWPT system 202 than on the DWPT base system 104 of the first type of conventional DWPT system 102.

However, because gaps exist between conductors 210-1, 210-2, 210-3, . . . , 210-$n$ of the DWPT base system 204 (e.g., gaps 220-$a$ and 220-$b$), strengths of corresponding magnetic coupling coefficients (e.g., magnetic fields 218-1, 218-2, and 218-3) at positions of these gaps can be less than a threshold magnetic coupling coefficient required to ensure sufficient coupling between the DWPT base system 204 and the DWPT receiving system 110.

Figure 3:
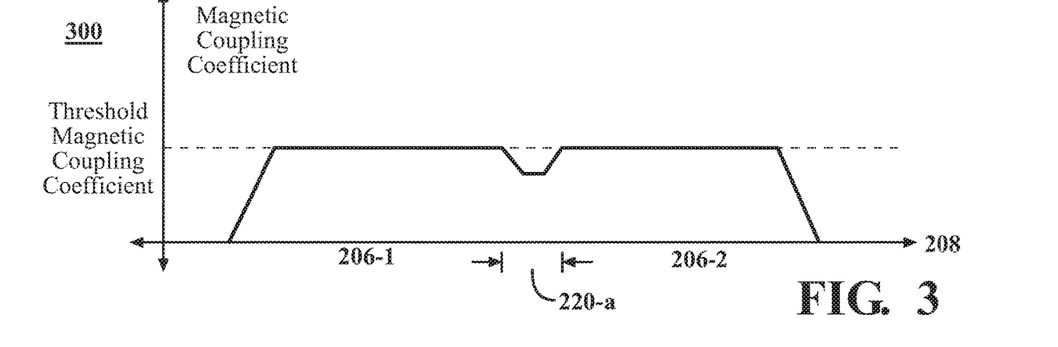
FIG. 3 is a graph of a first example of magnetic coupling coefficient versus a position along an axis of a DWPT base system.

FIG. 3 is a graph 300 of a first example of magnetic coupling coefficient versus a position along the axis 208 for an example of the DWPT base system 204 that only includes the DWPT base pads 206-1 and 206-2. As illustrated in the graph 300, the magnetic coupling coefficient for each of the DWPT base pads 206-1 and 206-2 is greater than or equal to a threshold magnetic coupling coefficient required to ensure sufficient coupling between the DWPT base system 204 and the DWPT receiving system 110 for all positions except at ends of each of the DWPT base pads 206-1 and 206-2. At the ends of each of the DWPT base pads 206-1 and 206-2, the magnetic coupling coefficient is less than the threshold magnetic coupling coefficient required to ensure sufficient coupling between the DWPT base system 204 and the DWPT receiving system 110. At the position at which the DWPT base pad 206-1 is adjacent to the DWPT base pad 206-2 (e.g., the gap 220-$a$), the magnetic coupling coefficient is less than the threshold magnetic coupling coefficient required to ensure sufficient coupling between the DWPT base system 204 and the DWPT receiving system 110.

The battery 114 can be, for example, a lithium-ion battery. Having the magnetic coupling coefficient at the gaps (e.g., the gaps 220-$a$ and 220-$b$) being less than the threshold magnetic coupling coefficient required to ensure sufficient power delivery between the DWPT base system 204 and the DWPT receiving system 110 can cause interruptions in an amount of the direct current used to charge the battery 114. Such interruptions, also referred to as power pulsations, may reduce a degree of utilization of components of the second type of conventional DWPT system 202, specifically the power convertor 112 and the multiple DWPT base pads 206-1, 206-2, 206-3, . . . , 206-$n$. Moreover, such power pulsations may produce undesirable electromagnetic interference (EMI) and may effect an operation of the power convertor 112 (or other circuit) to calculate an estimation of a state of a charge of the battery 114.

One solution to the problem of having the magnetic coupling coefficient at the gaps (e.g., the gaps 220-$a$ and 220-$b$) being less than the threshold magnetic coupling coefficient required to ensure sufficient coupling between the DWPT base system 204 and the DWPT receiving system 110 can be to increase an amount of the current conducted by each of the conductors 210-1, 210-2, 210-3, . . . , 210-$n$ to produce corresponding magnetic fields 218-1, 218-2, 218-3, . . . , 218-$n$ with larger magnetic field strengths.

Figure 4:
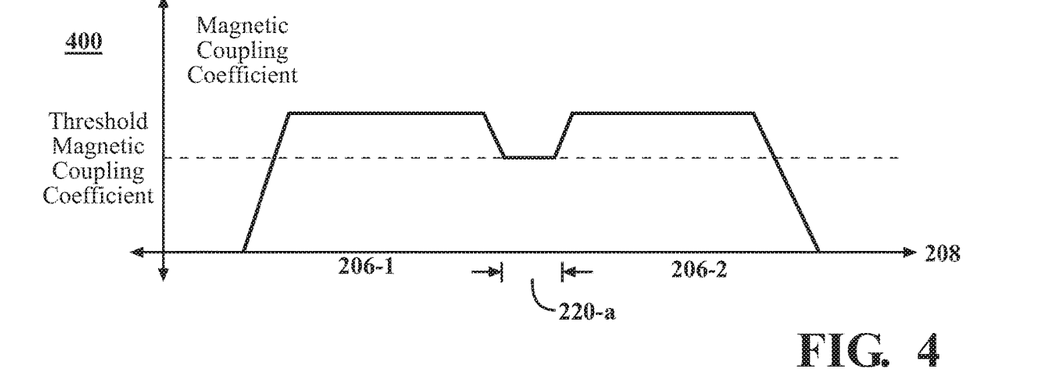
FIG. 4 is a graph of a second example of magnetic coupling coefficient versus the position along the axis of the DWPT base system.

FIG. 4 is a graph 400 of a second example of magnetic coupling coefficient versus the position along the axis 208 for the example of the DWPT base system 204 that only includes the DWPT base pads 206-1 and 206-2. As illustrated in the graph 400, the magnetic coupling coefficient for each of the DWPT base pads 206-1 and 206-2 is greater than or equal to the threshold magnetic coupling coefficient required to ensure sufficient coupling between the DWPT base system 204 and the DWPT receiving system 110 for all positions except at the bitter ends of the DWPT base system 204. At the position at which the DWPT base pad 206-1 is adjacent to the DWPT base pad 206-2 (e.g., the gap 220-$a$), the magnetic coupling coefficient is greater than or equal to the threshold magnetic coupling coefficient required to ensure sufficient coupling between the DWPT base system 204 and the DWPT receiving system 110.

However, in order to ensure that the magnetic coupling coefficient at the position at which the DWPT base pad 206-1 is adjacent to the DWPT base pad 206-2 (e.g., the gap 220-$a$) is greater than or equal to the threshold magnetic coupling coefficient required to ensure sufficient coupling between the DWPT base system 204 and the DWPT receiving system 110, the magnetic coupling coefficient at the positions other than the ends of each of the DWPT base pads 206-1 and 206-2 is substantially larger than the magnetic coupling coefficient needs to be at these positions. Not only does such a solution consume a substantial amount of power, but also such a solution can cause over-coupling between the DWPT base system 204 and the DWPT receiving system 110 at the positions other than the ends of each of the DWPT base pads 206-1 and 206-2.

Figure 5:
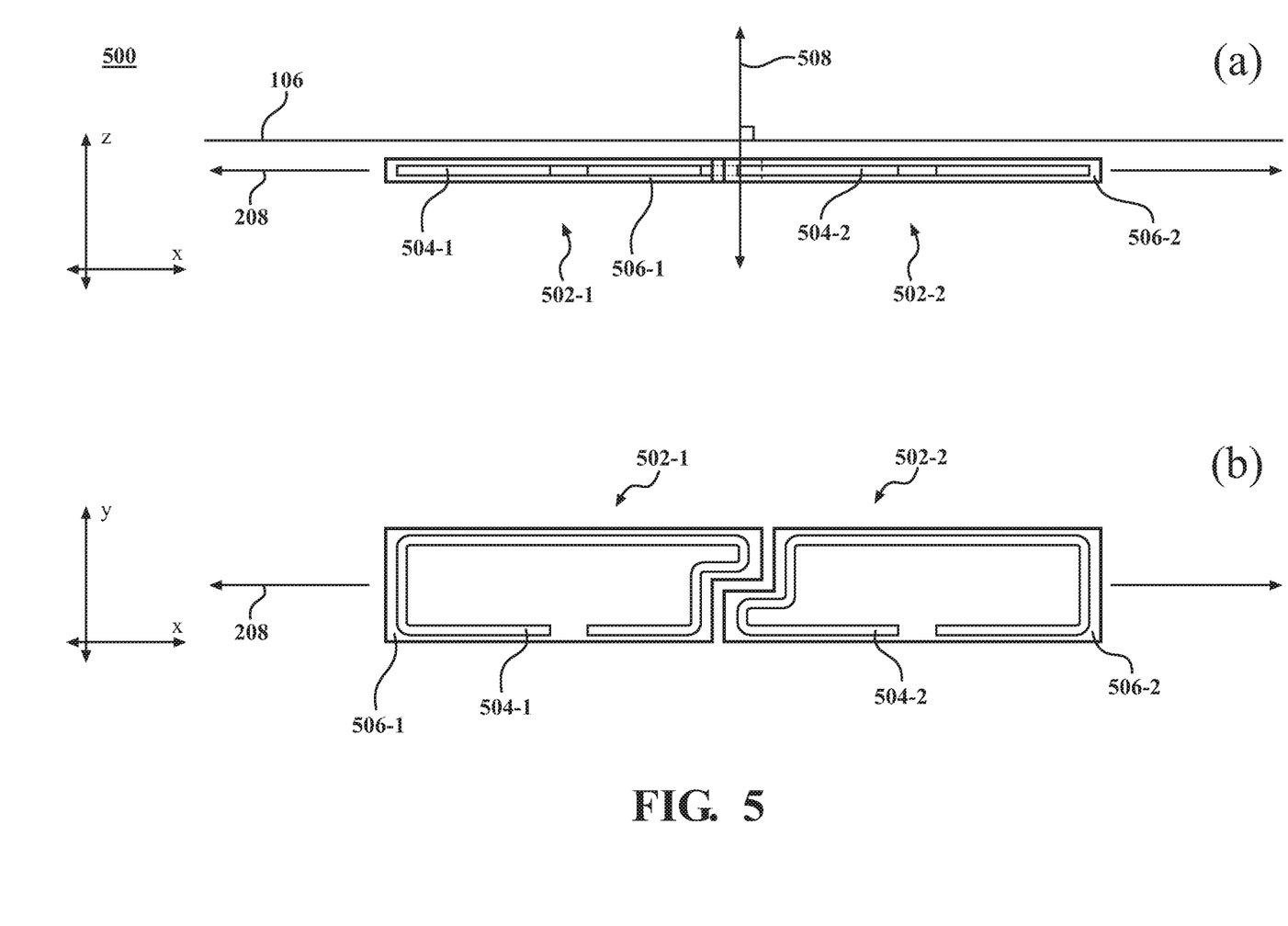
FIG. 5 is a diagram that includes an example of another DWPT base system.

FIG. 5 is a diagram that includes an example of another DWPT base system 500. The DWT base system 500 can be another solution to the problem of having the magnetic coupling coefficient at the gaps (e.g., the gaps 220-$a$ and 220-$b$) being less than the threshold magnetic coupling coefficient required to ensure sufficient coupling between the DWPT base system 204 and the DWPT receiving system 110. A view (a) of FIG. 5 is a diagram that includes the example of the DWPT base system 500 from a perspective of an x-z coordinate system. A view (b) of FIG. 5 is a diagram that includes the example of the DWPT base system 500 from a perspective of an x-y coordinate system. The DWPT base system 500 can be installed under the road 106 as illustrated in the view (a) of FIG. 5. Additionally or alternatively, the DWPT base system 500 can be installed next to the road 106 or on the road 106. The DWPT base system 500 can include DWPT base pads 502-1 and 502-2. The DWPT base pad 502-1 can be disposed, after the DWPT base system 500 has been installed, adjacent to the DWPT base pad 502-2. For example, the DWPT base pads 502-1 and 502-2 can be disposed along the axis 208. Each of the DWPT base pads 502-1 and 502-2 can include a corresponding conductor 504-1 and 504-2 disposed within a corresponding housing 506-1 and 506-2. The DWPT base system 500 can be configured so that, after the DWPT base system 500 has been installed, a line 508 perpendicular to a plane defined by the road 106 intersects both the conductor 504-1 and the conductor 504-2. That is, the DWPT base system 500 can be configured so that the conductor 504-1 overlaps the conductor 504-2.

Figure 6:
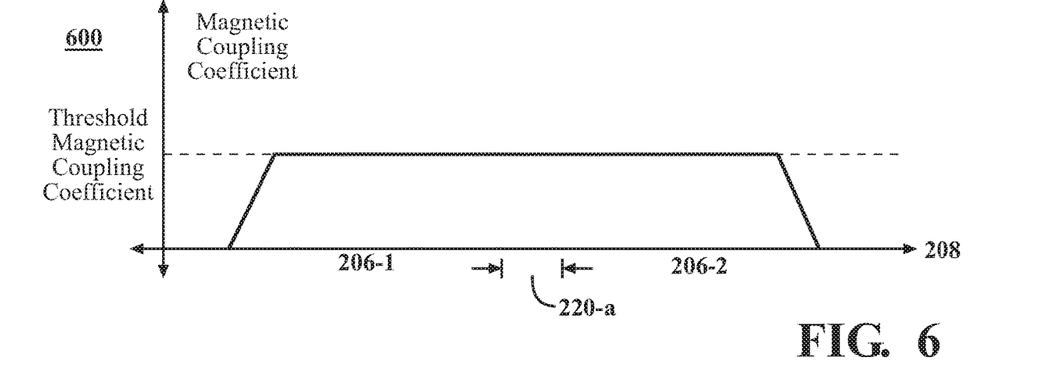
FIG. 6 is a graph of an example of magnetic coupling coefficient versus the position along the axis for two DWPT base pads of the other DWPT base system.

FIG. 6 is a graph 600 of an example of magnetic coupling coefficient versus the position along the axis 208 for the DWPT base pads 502-1 and 502-2. As illustrated in the graph 600, the magnetic coupling coefficient for each of the DWPT base pads 506-1 and 206-2 is greater than or equal to the threshold magnetic coupling coefficient required to ensure sufficient coupling between the DWPT base system 500 and the DWPT receiving system 110 for all positions except at the bitter ends of the DWPT base system 500. At the position at which the DWPT base pad 502-1 is adjacent to the DWPT base pad 502-2 (e.g., the gap 220-a), the magnetic coupling coefficient is greater than or equal to the threshold magnetic coupling coefficient required to ensure sufficient coupling between the DWPT base system 500 and the DWPT receiving system 110.

However, in order to ensure that the magnetic coupling coefficient at the position at which the DWPT base pad 502-1 is adjacent to the DWPT base pad 502-2 (e.g., the gap 220-a) is greater than or equal to the threshold magnetic coupling coefficient required to ensure sufficient coupling between the DWPT base system 500 and the DWPT receiving system 110, the DWPT base system 500 is configured in a manner that can complicate a performance of maintenance and repair procedures on the DWPT base system 500. That is, having a portion of the DWPT base pad 502-1 overlap a portion of the DWPT base pad 502-2 can complicate the performance of maintenance and repair procedures on the DWPT base system 500.

Figure 7:
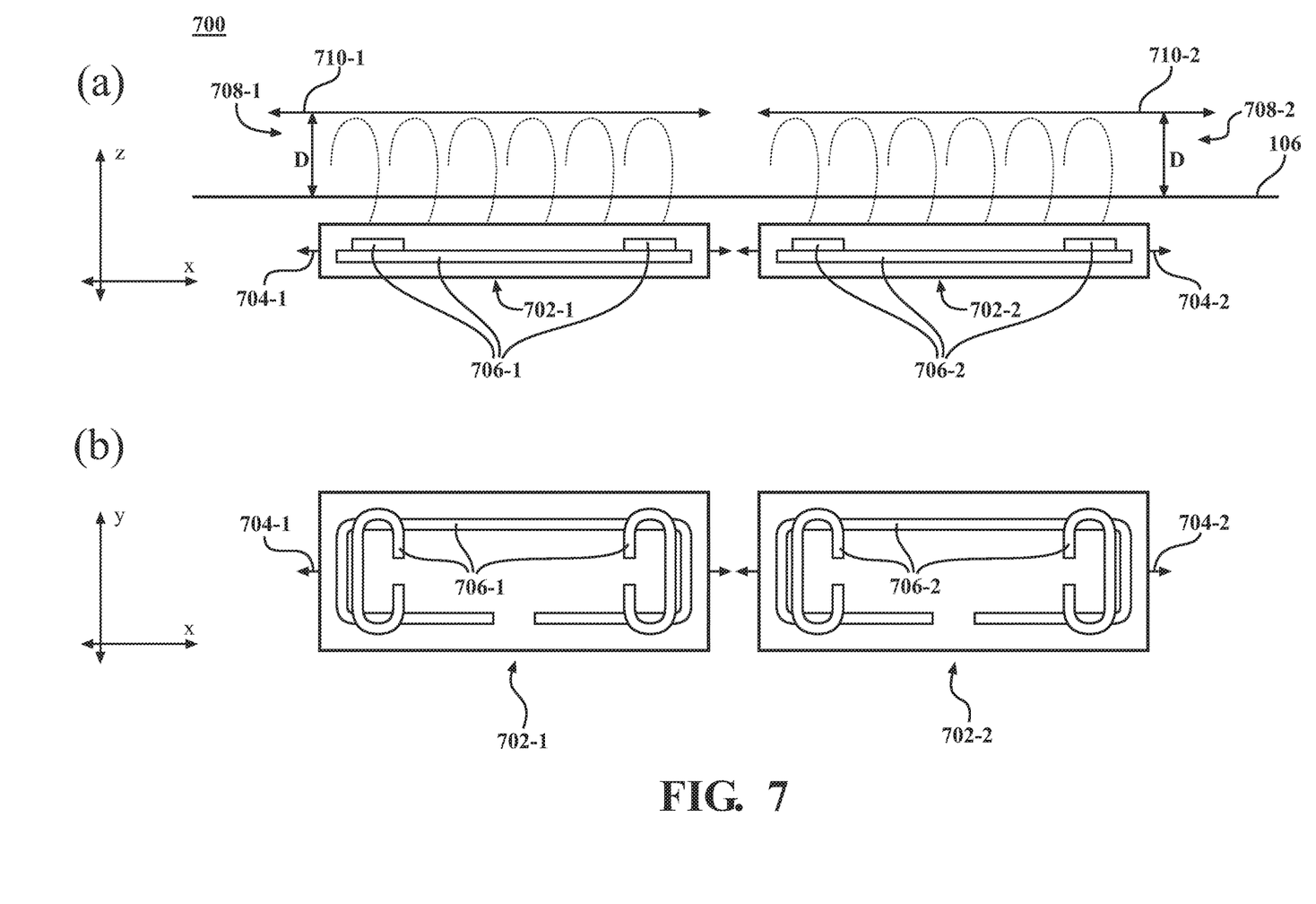
FIG. 7 is a diagram that includes an example of a DWPT base system, according to the disclosed technologies.

FIG. 7 is a diagram that includes an example of a DWPT base system 700, according to the disclosed technologies. A view (a) of FIG. 7 is a diagram that includes the example of the DWPT base system 700 from a perspective of an x-z coordinate system. A view (b) of FIG. 7 is a diagram that includes the example of the DWPT base system 700 from a perspective of an x-y coordinate system. The DWPT base system 700 can be installed under the road 106 as illustrated in the view (a) of FIG. 7. Additionally or alternatively, the DWPT base system 700 can be installed next to the road 106 or on the road 106. For example, the DWPT base system 700 can include a first DWPT base pad 702-1 and a second DWPT base pad 702-2. The first DWPT base pad 702-1 can have a simple closed curve shape defined by a first axis 704-1. The first DWPT base pad 702-1 can have one or more conductors 706-1 configured to conduct one or more currents to produce a magnetic field 708-1. The second DWPT base pad 702-2 can have the simple closed curve shape defined by a second axis 704-2. The second DWPT base pad 702-2 can have one or more conductors 706-2 configured to conduct one or more currents to produce a magnetic field 708-2. In an implementation, after the DWPT base system 700 has been installed, the first axis 704-1 can be the second axis 704-2 (e.g., a portion of the road 106 that is straight). In an implementation, after the DWPT base system 700 has been installed, the first axis 704-1 can be different from the second axis 704-2 (e.g., a portion of the road 106 that has a curve).

A strength of the magnetic field 708-1 can be substantially equal along a first line 710-1 a specific distance (D) above the road 106 and parallel to the first axis 704-1. For example, the strength of the magnetic field 708-1 along the first line 710-1 can vary by +/−20 percent of an average strength of the magnetic field 708-1 along the first line 710-1, except in a case in which an end of the first DWPT base pad 702-1 is a bitter end of the DWPT base system 700. A strength of the magnetic field 708-2 can be substantially equal along a second line 710-2 the specific distance (D) above the road 106 and parallel to the second axis 704-2. For example, the strength of the magnetic field 708-2 along the second line 710-2 can vary by +/−20 percent of an average strength of the magnetic field 708-2 along the second line 710-2, except in a case in which an end of the second DWPT base pad 702-2 is a bitter end of the DWPT base system 700. In an implementation, the first line 710-1 can intersect the second line 710-2. In an implementation, the strength of the magnetic field 708-1 can be substantially equal to the strength of the magnetic field 708-2.

The first DWPT base pad 702-1 can be disposed, after the DWPT base system 700 has been installed, adjacent to the second DWPT base pad 702-2. The DWPT base system 700 can be configured so that, after the DWPT base system 700 has been installed, no line perpendicular to a plane defined by the road 106 intersects both the one or more conductors 706-1 and the one or more conductors 706-2. That is, the DWPT base system 700 can be configured so that the one or more conductors 706-1 do not overlap the one or more conductors 706-2.

Figure 8:
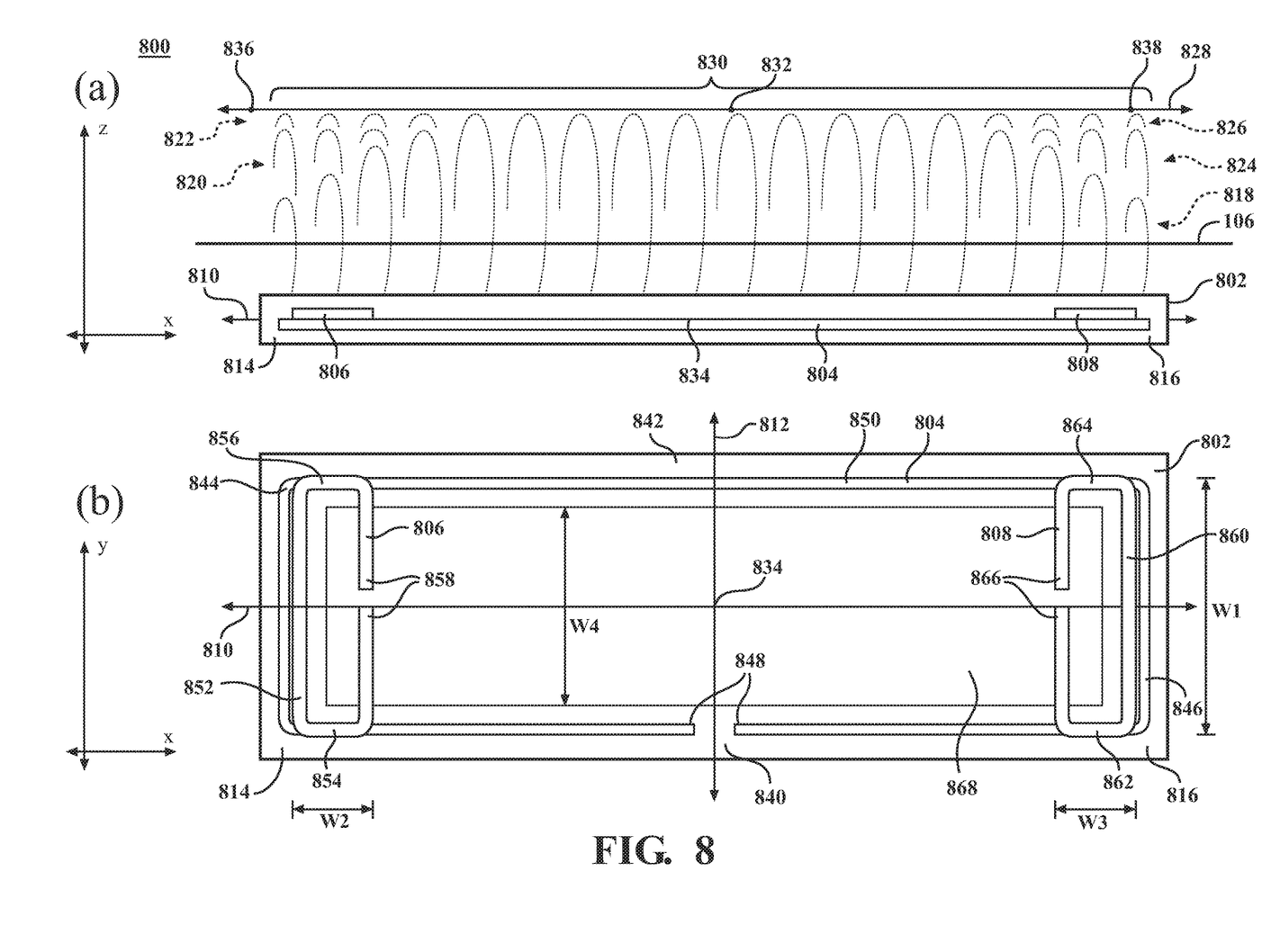
FIG. 8 is a diagram that includes an example of a DWPT base pad, according to the disclosed technologies.

FIG. 8 is a diagram that includes an example of a DWPT base pad 800, according to the disclosed technologies. A view (a) of FIG. 8 is a diagram that includes the example of the DWPT base system 800 from a perspective of an x-z coordinate system. A view (b) of FIG. 8 is a diagram that includes the example of the DWPT base system 800 from a perspective of an x-y coordinate system. For example, the first DWPT base pad 702-1, the second DWPT base pad 702-2, or each can be implemented as the DWPT base pad 800. For example, the DWPT base pad 800 can include a housing 802. For example, the one or more conductors 706-1, the one or more conductors 706-2, or each can include a first conductor 804, a second conductor 806, and a third conductor 808. The DWPT base pad 800 can be installed under the road 106 as illustrated in the view (a) of FIG. 8. Additionally or alternatively, the DWPT base pad 800 can be installed next to the road 106 or on the road 106.

The housing 802 can have the simple closed curve shape defined by a first axis 810 and a second axis 812. The housing 802 can have a first end 814 along the first axis 810. The housing 802 can have a second end 816 along the first axis 810. For example, the simple closed curve can be a rectangle, an ellipse, a superellipse, or the like. For example, a value of a dimension of the housing 802 along the first axis 810 can be greater than a value of a dimension of the housing 802 along the second axis 812. In an implementation, the first axis 810 can be the first axis 704-1, the second axis 704-2, or each.

The first conductor 804 can be disposed within the housing 802 substantially along a circumference of the housing 802. For example, the first conductor 804 can be disposed within the housing 802 along at least 45 percent of the circumference of the housing 802. The first conductor 804 can be configured to conduct a first current to produce a first magnetic field 818. For example, the first conductor 804 can include a coil of wire. For example, the coil of wire can have a substantially helical or a substantially spiral shape. The substantially helical shape can have a corkscrew form with tangent lines at a constant angle to a fixed axis. The substantially spiral shape can have a circular form with an increasing radius from a center point. For example, the wire can include a Litz wire. For example, if the first conductor 804 is a coil of wire, then a dimension of the wire in the x-y plane can be different from a dimension of the wire in the x-z plane. Additionally or alternatively, for example, the first conductor 804 can include a strip of metal.

The second conductor 806 can be disposed within the housing 802 at the first end 814. The second conductor 806 can be configured to conduct a second current to produce a second magnetic field 820. A magnetic field 822 at the first end 814 can include a constructive superimposition of the first magnetic field 818 with the second magnetic field 820. For example, the second conductor 806 can include a coil of wire. For example, the coil of wire can have a substantially helical or a substantially spiral shape. The substantially helical shape can have a corkscrew form with tangent lines at a constant angle to a fixed axis. The substantially spiral shape can have a circular form with an increasing radius from a center point. For example, the wire can include a Litz wire. For example, if the second conductor 806 is a coil of wire, then a dimension of the wire in the x-y plane can be different from a dimension of the wire in the x-z plane. Additionally or alternatively, for example, the second conductor 806 can include a strip of metal.

The third conductor 808 can be disposed within the housing 802 at the second end 816. The third conductor 808 can be configured to conduct a third current to produce a third magnetic field 824. A magnetic field 826 at the second end 816 can include a constructive superimposition of the first magnetic field 818 with the third magnetic field 824. For example, the third conductor 808 can include a coil of wire. For example, the coil of wire can have a substantially helical or a substantially spiral shape. The substantially helical shape can have a corkscrew form with tangent lines at a constant angle to a fixed axis. The substantially spiral shape can have a circular form with an increasing radius from a center point. For example, the wire can include a Litz wire. For example, if the third conductor 808 is a coil of wire, then a dimension of the wire in the x-y plane can be different from a dimension of the wire in the x-z plane. Additionally or alternatively, for example, the third conductor 808 can include a strip of metal.

In an implementation, a spacing can exist, along the x-z axis, between the first conductor 804 and one or more of the second conductor 806 or the third conductor 808. For example, such a spacing can be provided by insulation that surrounds one or more of the first conductor 804, the second conductor 806, or the third conductor 808. A value of a dimension of the spacing can be set so that a strength of a magnetic field 830 at a point 832 on a line 828 opposite a center 834 of the DWPT base pad 800 can be substantially equal to a strength of the magnetic field 830 at a point 836 on the line 828 opposite the first end 814 and can be substantially equal to a strength of the magnetic field 830 at a point 838 on the line 828 opposite the second end 816.

For example, the first conductor 804 can be configured to conduct the first current, the second conductor 806 can be configured to conduct the second current, and the third conductor 808 can be configured to conduct the third current to produce, along the line 828 above the road 106 and parallel to the first axis 810, the magnetic field 830. The strength of the magnetic field 830 at the point 832 on the line 828 opposite the center 834 of the DWPT base pad 800 can be substantially equal to a strength of the magnetic field 830 at the point 836 on the line 828 opposite the first end 814 and can be substantially equal to the strength of the magnetic field 830 at the point 838 on the line 828 opposite the second end 816. For example, the strength of the magnetic field 830 along the line 828 can vary by +/−20 percent of an average strength of the magnetic field 830 along the line 828, except in a case in which an end of the DWPT base pad 800 is a bitter end of a DWPT base system.

For example, the magnetic field 708-1, the magnetic field 708-2, or each can be the magnetic field 830, which can include the first magnetic field 818, the second magnetic field 820, and the third magnetic field 824.

The housing 802 can have a third end 840 along the second axis 812. The housing 802 can have a fourth end 842 along the second axis 812. For example, the first conductor 804 can have: (1) a portion 844 nearest to the first end 814, (2) a portion 846 nearest to the second end 816, (3) a portion 848 nearest to the third end 840, and (4) a portion 850 nearest to the fourth end 842. For example, the second conductor 806 can have: (1) a portion 852 nearest to the first end 814, (2) a portion 854 nearest to the third end 840, (3) a portion 856 nearest to the fourth end 842, and (4) a portion 858 furthest from the first end 814. For example, the third conductor 808 can have: (1) a portion 860 nearest to the second end 816, (2) a portion 862 nearest to the third end 840, (3) a portion 864 nearest to the fourth end 842, and (4) a portion 866 furthest from the second end 816.

For example, a value of one or more of: (1) a width of one or more of: (a) the portion 844, the portion 846, the portion 848, the portion 850, the portion 852, the portion 854, the portion 856, the portion 858, the portion 860, the portion 862, the portion 864, or the portion 866; (2) a width of one or more of: (a) a whole of the first conductor 804 ($W_1$), (b) a whole of the second conductor 806 ($W_2$), or (c) a whole the third conductor ($W_3$); or (3) a dimension, along the second axis 812, of a magnetic core 868 disposed within the housing 802 ($W_4$) can be set so that the strength of the magnetic field 830 at the point 832 on the line 828 opposite the center 834 of the DWPT base pad 800 can be substantially equal to the strength of the magnetic field 830 at the point 836 on the line 828 opposite the first end 814 and can be substantially equal to the strength of the magnetic field 830 at the point 838 on the line 828 opposite the second end 816.

In an implementation of the DWPT base pad 800, one or more of the first conductor 804, the second conductor 806, or the third conductor 808 can include a coil of a wire. For example, the DWPT base pad 800 can further include the magnetic core 868. The coil of the wire can surround the magnetic core 868. For example, a thickness of the magnetic core 868 at the center 834 of the DWPT base pad 800 can be less than a thickness of the magnetic core 868 at one or more of the first end 814 or the second end 816.

In an implementation of the DWPT base pad 800, the first conductor 804 can include a first coil of a wire having a first number of turns, the second conductor 806 can include a second coil of the wire having a second number of turns, and the third conductor 808 can include a third coil of the wire having a third number of turns. For example, the first conductor 804 can be configured to conduct the first current, the second conductor 806 can be configured to conduct the second current, and the third conductor 808 can be configured to conduct the third current to produce, along the line 828 above the road 106 and parallel to the first axis 810, the magnetic field 830. A value of one or more of the first number of turns, the second number of turns, or the third number of turns can be set so that the strength of the magnetic field 830 at the point 832 on the line 828 opposite the center 834 of the DWPT base pad 800 can be substantially equal to the strength of the magnetic field 830 at the point 836 on the line 828 opposite the first end 814 and can be substantially equal to the strength of the magnetic field 830 at the point 838 on the line 828 opposite the second end 816. For example, the strength of the magnetic field 830 along the line 828 can vary by +/−20 percent of the average strength of the magnetic field 830 along the line 828, except in a case in which an end of the DWPT base pad 800 is a bitter end of a DWPT base system. For example, the third number of turns can be equal to the second number of turns. Alternatively, the third number of turns can be different from the second number of turns.

With reference to the view (a) in FIG. 8, a first position along the z-axis of the first conductor 804 can be different from a second position along the z-axis of each of the second conductor 806 and the third conductor 808. However, in the implementation in which the first conductor 804 includes the first coil of the wire having the first number of turns, the second conductor 806 includes the second coil of the wire having the second number of turns, and the third conductor 808 includes the third coil of the wire having the third number of turns, the DWPT base pad 800 can be configured so that one or more of: (1) some of the first number of turns are at the second position, (2) some the second number of turns are at the first position, or (3) some of the third number of turns are at the first position.

Figure 9:
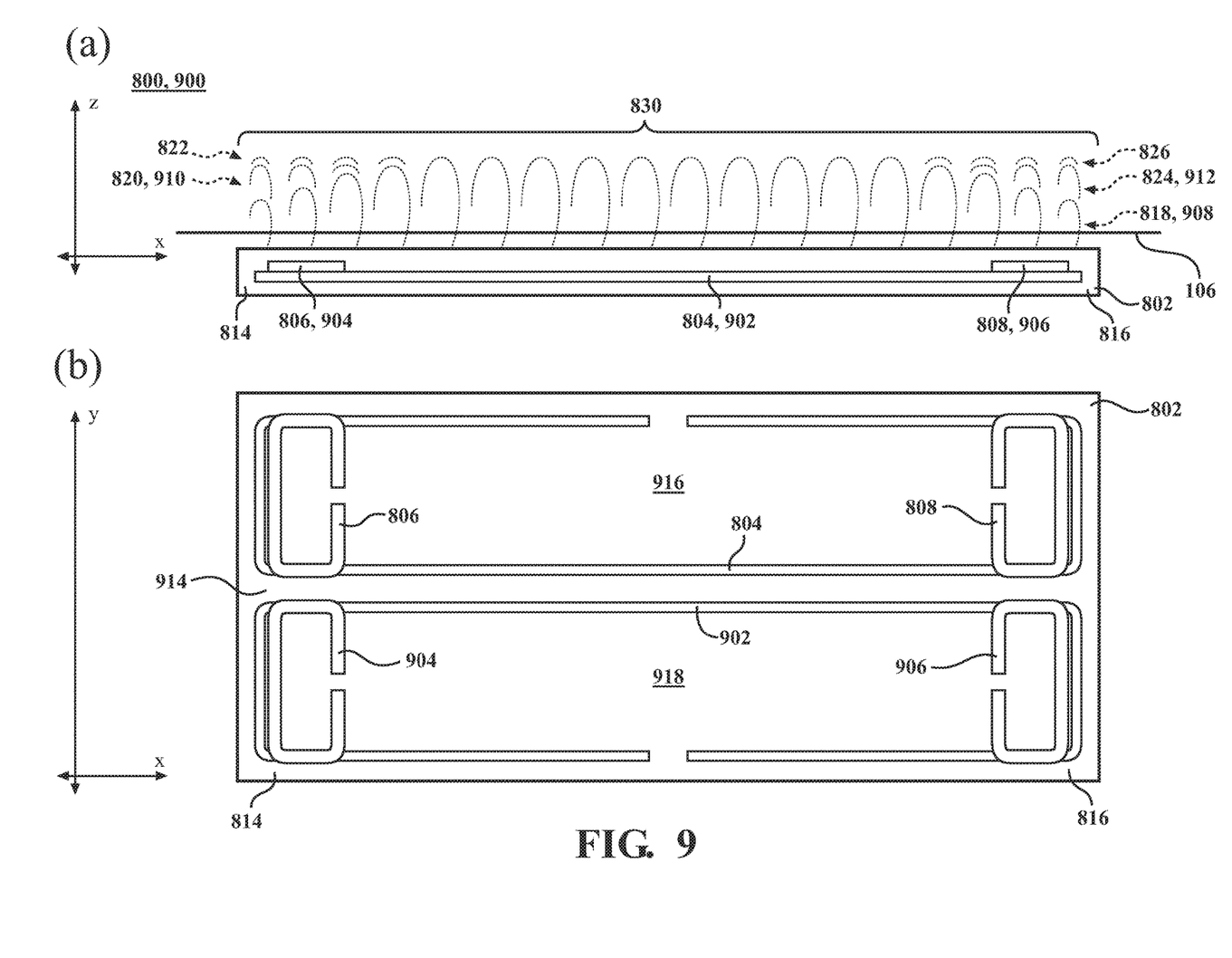
FIG. 9 is a diagram that includes a variation of the example of the DWPT base pad, according to the disclosed technologies.

FIG. 9 is a diagram that includes a variation 900 of the example of the DWPT base pad 800, according to the disclosed technologies. In the variation 900, the DWPT base pad 800 can further include a fourth conductor 902, a fifth conductor 904, and a sixth conductor 906.

The fourth conductor 902 can be disposed within the housing 802 substantially along the circumference of the housing 802. The fourth conductor 902 can be configured to conduct a fourth current to produce a fourth magnetic field 908.

The fifth conductor 904 can be disposed within the housing 802 at the first end 814. The fifth conductor 904 can be configured to conduct a fifth current to produce a fifth magnetic field 910. The magnetic field 822 at the first end 814 can further include a constructive superimposition of the fourth magnetic field 908 with the fifth magnetic field 910.

The sixth conductor 906 can be disposed within the housing 802 at the second end 816. The sixth conductor 906 can be configured to conduct a sixth current to produce a sixth magnetic field 912. The magnetic field 826 at the second end 816 can further include a constructive superimposition of the fourth magnetic field 908 with the sixth magnetic field 912.

A space 914 within the housing 802 can include a first half 916 and a second half 918. The first conductor 804, the second conductor 806, and the third conductor 808 can be disposed in the first half 916. The fourth conductor 902, the fifth conductor 904, and the sixth conductor 906 ca be disposed in the second half 918.

In an implementation: (1) the second current can be different from the first current and (2) the third current can be different from the first current. The third current can be equal to the second current. Alternatively, the third current can be different from the second current. Additionally, in the variation 900: (1) the fifth current can be different from the fourth current and (2) the sixth current can be different from the fourth current. The sixth current can be equal to the fifth current. Alternatively, the sixth current can be different from the fifth current. Moreover: (1) the fourth current can be equal to the first current, (2) the fifth current can be equal to the second current, and (3) the sixth current can be equal to the third current. Alternatively: (1) the fourth current can be different from the first current, (2) the fifth current can be different from the second current, and (3) the sixth current can be different from the third current.

Figure 10:
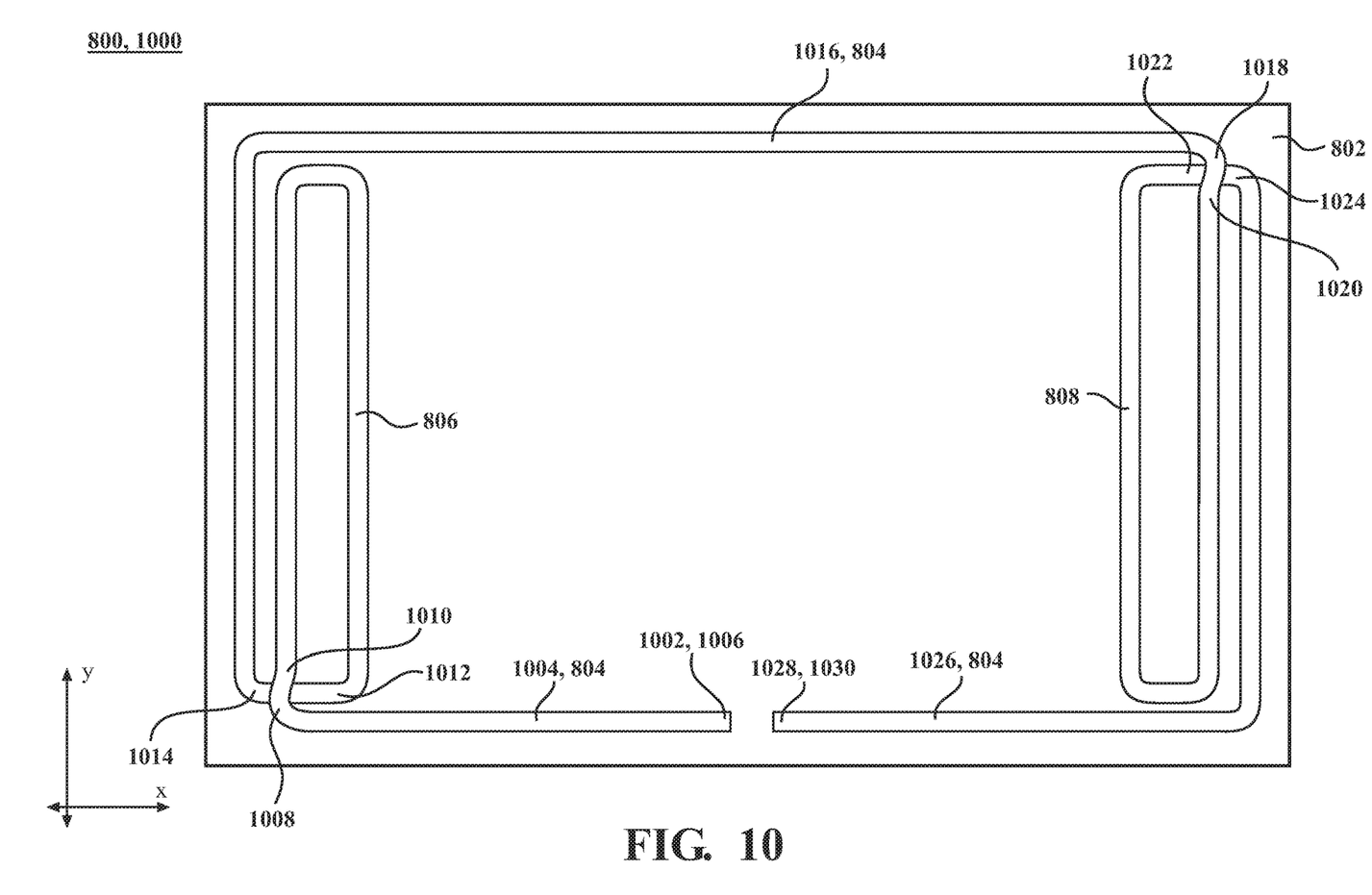
FIG. 10 is a diagram that includes an alternative example of the DWPT base pad, according to the disclosed technologies.

FIG. 10 is a diagram that includes an alternative example 1000 of the DWPT base pad 800, according to the disclosed technologies. In the alternative example 1000: (1) a first end 1002 of a first portion 1004 of the first conductor 804 can have a first lead 1006, (2) a second end 1008 of the first portion 1004 of the first conductor 804 can be connected in series to a first end 1010 of the second conductor 806, (3) a second end 1012 of the second conductor 806 can be connected in series to a first end 1014 of a second portion 1016 of the first conductor 804, (4) a second end 1018 of the second portion 1016 of the first conductor 804 can be connected in series to a first end 1020 of the third conductor 808, (5) a second end 1022 of the third conductor 808 can be connected in series to a first end 1024 of a third portion 1026 of the first conductor 804, and (6) and a second end 1028 of the third portion 1026 of the first conductor 804 can have a second lead 1030. The second current can be the first current. The third current can be the first current.

Figure 11:
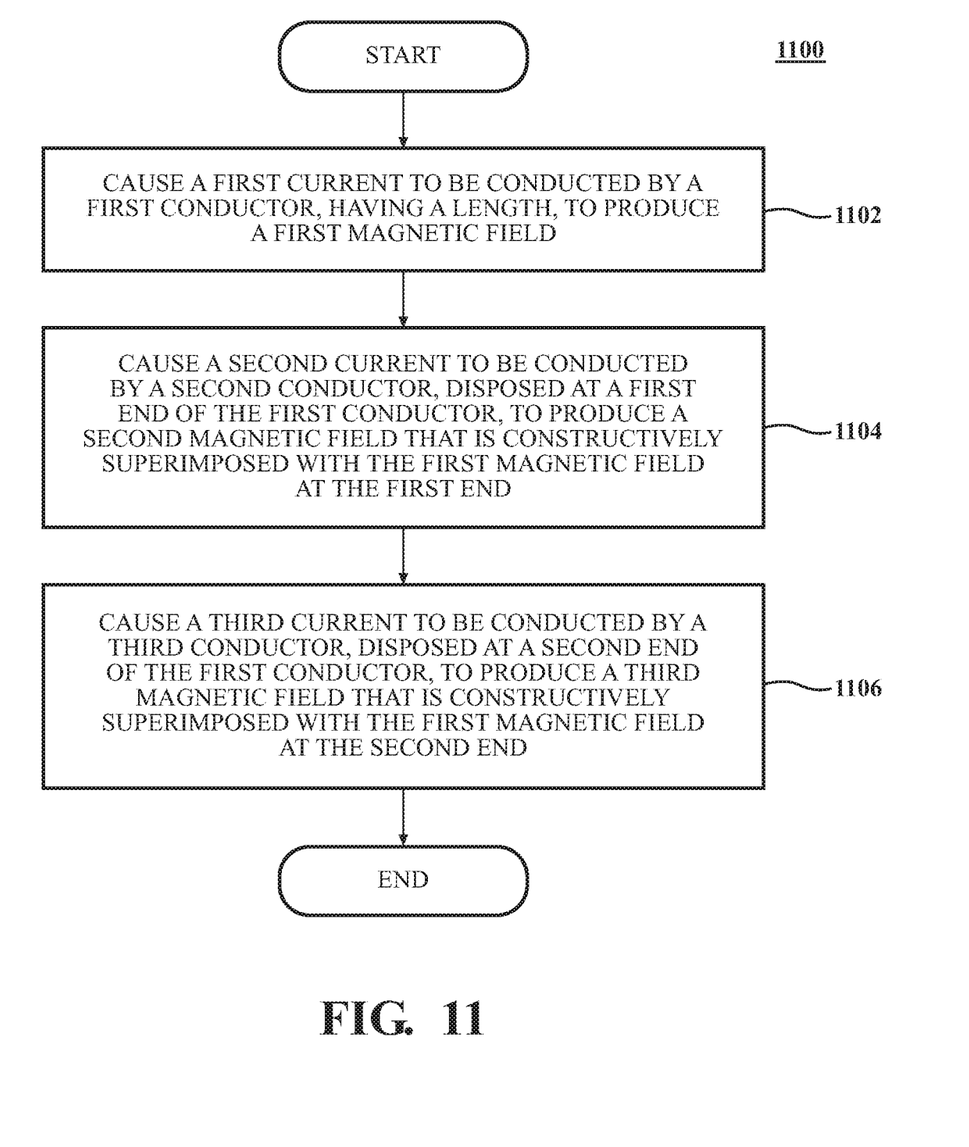
FIG. 11 is a flow diagram that illustrates an example of a method that is associated with producing a combined magnetic field, according to the disclosed technologies.

FIG. 11 is a flow diagram that illustrates an example of a method 1100 that is associated with producing a combined magnetic field, according to the disclosed technologies.

The method 1100 is described from the perspective of the DWPT base pad 800 illustrated in FIGS. 8, 9, and 10. Although the method 1100 is described in combination with the DWPT base pad 800, one of skill in the art understands, in light of the description herein, that the method 1100 is not limited to being implemented by the DWPT base pad 800. Rather, the DWPT base pad 800 is one example of a device that may be used to implement the method 1100. Additionally, although the method 1100 is illustrated as a generally serial process, various aspects of the method 1100 may be able to be executed in parallel.

In the method 1100, at an operation 1102, a first current can be caused to be conducted by a first conductor, having a length, to produce a first magnetic field.

At an operation 1104, a second current can be caused to be conducted by a second conductor, disposed at a first end of the first conductor, to produce a second magnetic field. A magnetic field at the first end can include a constructive superimposition of the first magnetic field with the second magnetic field.

At an operation 1106, a third current can be caused to be conducted by a third conductor, disposed at a second end of the first conductor, to produce a third magnetic field. A magnetic field at the second end can include a constructive superimposition of the first magnetic field with the third magnetic field. The second end can be opposite the first end.

The combined magnetic field can be produced along a line parallel to the length so that a strength of the combined magnetic field at a point on the line opposite a center of the length can be substantially equal to a strength of the combined magnetic field at a point on the line opposite the first end and can be substantially equal to a strength of the combined magnetic field at a point on the line opposite the second end.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 7-11, but the embodiments are not limited to the illustrated structure or application.

The flowchart and block diagrams in the figures illustrate the architecture, functionality, and operation of possible implementations of systems and methods according to various embodiments. One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of ... or ... " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A dynamic wireless power transfer base pad, comprising:
   a housing having a simple closed curve shape defined by a first axis and a second axis, having a first end along the first axis, and having a second end along the first axis;
   a first conductor disposed within the housing substantially along a circumference of the housing and configured to conduct a first current to produce a first magnetic field;
   a second conductor disposed within the housing at the first end and configured to conduct a second current to produce a second magnetic field so that a magnetic field at the first end comprises a constructive superimposition of the first magnetic field with the second magnetic field; and
   a third conductor disposed within the housing at the second end and configured to conduct a third current to produce a third magnetic field so that a magnetic field at the second end comprises a constructive superimposition of the first magnetic field with the third magnetic field,
   wherein the dynamic wireless power transfer base pad is configured to be installed at least one of under a road, next to the road, or on the road, and
   wherein, in response to the first current and the second current, a fourth magnetic field is produced along a line above the road and parallel to the first axis, a strength of the fourth magnetic field at a point on the line opposite a center of the dynamic wireless power transfer base pad being substantially equal to a strength of the fourth magnetic field at a point on the line opposite the first end.

2. The dynamic wireless power transfer base pad of claim 1, wherein at least one of:
   the simple closed curve shape is a rectangle, an ellipse, or a superellipse, or
   a value of a dimension of the housing along the first axis is greater than a value of a dimension of the housing along the second axis.

3. The dynamic wireless power transfer base pad of claim 1, wherein the first conductor is configured to conduct the first current, the second conductor is configured to conduct the second current, and the third conductor is configured to conduct the third current, the strength of the fourth magnetic field at the point on the line opposite the center of the dynamic wireless power transfer base pad being substantially equal to a strength of the fourth magnetic field at a point on the line opposite the second end.

4. The dynamic wireless power transfer base pad of claim 3, wherein a value of at least one of:
   a width of at least one of the first conductor, the second conductor, or the third conductor,
   a dimension, along the second axis, of the first conductor,
   a dimension, along the first axis, of at least one of the second conductor or the third conductor, or
   a dimension, along the second axis, of a magnetic core disposed within the housing
   is set so that the strength of the fourth magnetic field at the point on the line opposite the center of the dynamic wireless power transfer base pad is substantially equal to the strength of the fourth magnetic field at the point on the line opposite the first end and is substantially equal to the strength of the fourth magnetic field at the point on the line opposite the second end.

5. The dynamic wireless power transfer base pad of claim 1, further comprising:
   a fourth conductor disposed within the housing substantially along the circumference of the housing and configured to conduct a fourth current to produce a fourth magnetic field;
   a fifth conductor disposed within the housing at the first end and configured to conduct a fifth current to produce a fifth magnetic field so that the magnetic field at the first end further comprises a constructive superimposition of the fourth magnetic field with the fifth magnetic field; and
   a sixth conductor disposed within the housing at the second end and configured to conduct a sixth current to produce a sixth magnetic field so that the magnetic field at the second end further comprises a constructive superimposition of the fourth magnetic field with the sixth magnetic field, wherein:
   a space within the housing comprises a first half and a second half, the first conductor, the second conductor, and the third conductor are disposed in the first half, and
   the fourth conductor, the fifth conductor, and the sixth conductor are disposed in the second half.

6. The dynamic wireless power transfer base pad of claim 1, wherein:
   a first end of a first portion of the first conductor has a first lead,
   a second end of the first portion of the first conductor is connected in series to a first end of the second conductor,
   a second end of the second conductor is connected in series to a first end of a second portion of the first conductor, a second end of the second portion of the first conductor is connected in series to a first end of the third conductor, a second end of the third conductor has a second lead, the second current is the first current, and the third current is the first current.

7. The dynamic wireless power transfer base pad of claim 1, wherein:

at least one of the first conductor, the second conductor, or the third conductor comprises a coil of a wire, and the coil of the wire has a substantially helical shape or a substantially spiral shape.

8. The dynamic wireless power transfer base pad of claim 7, wherein the wire comprises a Litz wire.

9. The dynamic wireless power transfer base pad of claim 7, further comprising a magnetic core, wherein the coil of the wire surrounds the magnetic core.

10. The dynamic wireless power transfer base pad of claim 9, wherein a thickness of the magnetic core at a center of the dynamic wireless power transfer base pad is less than a thickness of the magnetic core at at least one of the first end or the second end.

11. The dynamic wireless power transfer base pad of claim 1, wherein:

the first conductor comprises a first coil of a wire having a first number of turns, the second conductor comprises a second coil of the wire having a second number of turns, and the third conductor comprises a third coil of the wire having a third number of turns.

12. The dynamic wireless power transfer base pad of claim 11, wherein:

the first conductor is configured to conduct the first current, the second conductor is configured to conduct the second current, and the third conductor is configured to conduct the third current to produce, along a line above the road and parallel to the first axis, a fourth magnetic field, and a value of at least one of the first number of turns, the second number of turns, or the third number of turns is set so that a strength of the fourth magnetic field at a point on the line opposite a center of the dynamic wireless power transfer base pad is substantially equal to a strength of the fourth magnetic field at a point on the line opposite the first end and is substantially equal to a strength of the fourth magnetic field at a point on the line opposite the second end.

13. The dynamic wireless power transfer base pad of claim 1, wherein at least one of the first conductor, the second conductor, or the third conductor comprises a strip of metal.

14. The dynamic wireless power transfer base pad of claim 1, wherein at least one of:

the second current is different from the first current, the third current is different from the first current, or the third current is different from the second current.

15. A dynamic wireless power transfer base system, comprising:

a first dynamic wireless power transfer base pad having a simple closed curve shape defined by a first axis, and having at least one first conductor configured to conduct at least one first current to produce a first magnetic field; and a second dynamic wireless power transfer base pad having the simple closed curve shape defined by a second axis, and having at least one second conductor configured to conduct at least one second current to produce a second magnetic field, wherein:

the dynamic wireless power transfer base system is configured to be installed at least one of under a road, next to the road, or on the road, a strength of the first magnetic field is substantially equal along a first line a specific distance above the road and parallel to the first axis, a strength of the second magnetic field is substantially equal along a second line the specific distance above the road and parallel to the second axis, the first dynamic wireless power transfer base pad is disposed, after the dynamic wireless power transfer base system has been installed, adjacent to the second dynamic wireless power transfer base pad, and the dynamic wireless power transfer base system is configured so that, after the dynamic wireless power transfer base system has been installed, no line perpendicular to a plane defined by the road intersects both the at least one first conductor and the at least one second conductor.

16. The dynamic wireless power transfer base system of claim 15, wherein:

at least one of the first dynamic wireless power transfer base pad or the second dynamic wireless power transfer base pad comprises a housing having the simple closed curve shape defined by a third axis and a fourth axis, having a first end along the third axis, and having a second end along the third axis, the third axis being the first axis or the second axis, at least one of the at least one first conductor configured to conduct the at least one first current to produce the first magnetic field or the at least one second conductor configured to conduct the at least one second current to produce the second magnetic field comprises:

a third conductor disposed within the housing substantially along a circumference of the housing and configured to conduct a third current to produce a third magnetic field;

a fourth conductor disposed within the housing at the first end and configured to conduct a fourth current to produce a fourth magnetic field so that a magnetic field at the first end comprises a constructive superimposition of the third magnetic field with the fourth magnetic field; and a fifth conductor disposed within the housing at the second end and configured to conduct a fifth current to produce a fifth magnetic field so that a magnetic field at the second end comprises a constructive superimposition of the third magnetic field with the fifth magnetic field, and at least one of the first magnetic field or the second magnetic field comprises the third magnetic field, the fourth magnetic field, and the fifth magnetic field.

17. The dynamic wireless power transfer base system of claim 15, wherein, after the dynamic wireless power transfer base system has been installed, the first axis is the second axis.

18. The dynamic wireless power transfer base system of claim 15, wherein, after the dynamic wireless power transfer base system has been installed, the first axis is different from the second axis.

19. The dynamic wireless power transfer base system of claim 17, wherein at least one of:
the first line intersects the second line, or
the strength of the first magnetic field is substantially equal to the strength of the second magnetic field.

20. A method for producing a combined magnetic field, the method comprising:
causing a first current to be conducted by a first conductor, having a length, to produce a first magnetic field;
causing a second current to be conducted by a second conductor, disposed at a first end of the first conductor, to produce a second magnetic field so that a magnetic field at the first end comprises a constructive superimposition of the first magnetic field with the second magnetic field; and
causing a third current to be conducted by a third conductor, disposed at a second end of the first conductor, to produce a third magnetic field so that a magnetic field at the second end comprises a constructive superimposition of the first magnetic field with the third magnetic field, the second end being opposite the first end,
wherein the combined magnetic field is produced along a line parallel to the length so that a strength of the combined magnetic field at a point on the line opposite a center of the length is substantially equal to a strength of the combined magnetic field at a point on the line opposite the first end and is substantially equal to a strength of the combined magnetic field at a point on the line opposite the second end.

* * * * *